United States Patent
Paquette et al.

(10) Patent No.: US 8,140,215 B2
(45) Date of Patent: Mar. 20, 2012

(54) METHOD AND APPARATUS FOR GEOSPATIAL DATA SHARING

(75) Inventors: Daniel R. Paquette, Endicott, NY (US); James C. Rosswog, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 418 days.

(21) Appl. No.: 12/177,334

(22) Filed: Jul. 22, 2008

(65) Prior Publication Data
US 2010/0023206 A1 Jan. 28, 2010

(51) Int. Cl.
*G06F 19/00* (2011.01)
*G06F 17/30* (2006.01)

(52) U.S. Cl. .......... 701/35; 701/117; 340/901; 340/989; 348/143; 348/231.3; 707/921

(58) Field of Classification Search ................... 340/438, 340/901–905, 935, 945, 963, 971; 369/21; 701/14, 23, 29, 33, 35, 117, 120, 300, 200, 701/1; 707/918–922, 967, 999.201; 348/231.3, 348/231.5, 231.99, 231.6, 143–148; 345/537
See application file for complete search history.

(56) References Cited

U.S. PATENT DOCUMENTS

| | | | |
|---|---|---|---|
| 5,633,678 A * | 5/1997 | Parulski et al. ............ 348/231.5 |
| 5,883,586 A * | 3/1999 | Tran et al. ...................... 340/945 |
| 6,133,867 A | 10/2000 | Eberwine et al. |
| 6,240,347 B1 * | 5/2001 | Everhart et al. ................ 701/36 |
| 6,330,858 B1 | 12/2001 | McDonough et al. |
| 6,338,011 B1 * | 1/2002 | Furst et al. ........................ 701/1 |
| 6,405,212 B1 * | 6/2002 | Samu et al. ........................... 1/1 |
| 6,421,080 B1 * | 7/2002 | Lambert ....................... 348/143 |
| 6,831,556 B1 * | 12/2004 | Boykin ....................... 340/539.1 |
| 6,922,703 B1 | 7/2005 | Snyder et al. |
| 7,020,546 B2 * | 3/2006 | Nagai et al. ...................... 701/29 |
| 7,030,914 B2 * | 4/2006 | Yamagami ................. 348/231.2 |
| 7,130,742 B2 | 10/2006 | Kobuya et al. |
| 7,218,227 B2 | 5/2007 | Davis et al. |
| 7,236,799 B2 | 6/2007 | Wilson et al. |
| 7,577,199 B1 * | 8/2009 | Herz ............................. 348/143 |
| 7,760,908 B2 * | 7/2010 | Curtner et al. ................ 382/103 |
| 7,847,820 B2 * | 12/2010 | Vallone et al. ................ 348/143 |
| 2002/0118118 A1 | 8/2002 | Myllymaki et al. |
| 2002/0183072 A1 | 12/2002 | Steinbach et al. |
| 2003/0023614 A1 * | 1/2003 | Newstrom et al. ......... 707/104.1 |
| 2004/0107042 A1 | 6/2004 | Seick |
| 2004/0143602 A1 * | 7/2004 | Ruiz et al. .................. 707/104.1 |
| 2004/0212637 A1 * | 10/2004 | Varghese ...................... 345/723 |

(Continued)

*Primary Examiner* — Thomas Black
*Assistant Examiner* — Lindsay M Browder
(74) *Attorney, Agent, or Firm* — Wolf, Greenfield & Sacks, P.C.

(57) ABSTRACT

Methods and apparatus for processing non-authoritative observational data during a coordinated operation, such as a military mission. Actuation of a trigger control initiates a retrieval procedure for collecting observational data from at least one system incorporated in a vehicle. Categories associated with an observational event may be selected to classify the observational data, and the selected category may be stored with the observational data in a memory. The observational data may be stored in the memory as one or more data structures called "tags." A tag may be transmitted in real time to one or more operators in the coordinated operation via a wireless network. Stored observational information may be reviewed and edited by an operator to add additional annotations to a tag. A secondary review by supervising personnel may determine if the non-authoritative tag should be added to an authoritative source used for planning of future missions.

20 Claims, 8 Drawing Sheets

U.S. PATENT DOCUMENTS

| | | |
|---|---|---|
| 2005/0065711 A1* | 3/2005 | Dahlgren et al. ............ 701/117 |
| 2005/0113994 A1 | 5/2005 | Bell et al. |
| 2005/0114357 A1* | 5/2005 | Chengalvarayan et al. .. 707/100 |
| 2005/0132414 A1* | 6/2005 | Bentley et al. ................ 725/105 |
| 2005/0149251 A1 | 7/2005 | Donath et al. |
| 2006/0022986 A1* | 2/2006 | LinneVonBerg et al. ..... 345/537 |
| 2006/0095202 A1 | 5/2006 | Atarashi et al. |
| 2006/0136127 A1 | 6/2006 | Coch et al. |
| 2006/0221891 A1* | 10/2006 | Schmitz et al. ............... 370/328 |
| 2007/0060045 A1* | 3/2007 | Prautzsch .................... 455/3.06 |
| 2007/0087756 A1 | 4/2007 | Hoffberg |
| 2007/0124332 A1* | 5/2007 | Ballesty et al. ............ 707/104.1 |
| 2007/0136078 A1* | 6/2007 | Plante ............... 705/1 |
| 2007/0152804 A1 | 7/2007 | Breed et al. |
| 2007/0233384 A1 | 10/2007 | Lee |
| 2007/0244633 A1 | 10/2007 | Phillips et al. |
| 2007/0260363 A1* | 11/2007 | Miller ............... 701/2 |
| 2008/0319604 A1* | 12/2008 | Follmer et al. .................. 701/35 |

* cited by examiner

| IDENTIFIER A | CATEGORY | GPS/ LOCATION DATA | SENSOR DATA | ANNOTATION |
|---|---|---|---|---|
| IDENTIFIER B | | | | |
| IDENTIFIER C | | | | |
| IDENTIFIER D | | | | |

FIG. 2

METHOD AND APPARATUS FOR GEOSPATIAL DATA SHARING

TECHNICAL FIELD

The invention relates generally to the collection and sharing of observational data, and more specifically to the storage and transmittal of geospatial data for military operations.

BACKGROUND

Large quantities of information may be collected and analyzed for strategic planning of coordinated operations. Such information may be collected from a variety of sources, and may be stored in one or more centralized databases. For example, previous operations may include one or more military missions, such as a tactical airstrike, a ground campaign, or a reconnaissance mission. Following a mission, a debriefing may be scheduled to obtain information from some or all of the military personnel (e.g., pilots, soldiers) involved in the mission. Such information may include various observations, and these observations may be recorded using informal methods, such as by writing the observations on a whiteboard or a piece of paper. For example, a pilot may report seeing low power lines which should be avoided, or a soldier may report receiving enemy fire from a house along a main road. Some or all of the information collected during a debriefing may be collated and entered into a database for analysis.

Additional information gathered by analysts may also be considered when planning a coordinated operation such as a military mission. For example, analysts may examine one or more satellite images to determine possible locations of enemy targets or other hazardous conditions. These points of interest may be flagged on a schematic of a map and the map may be uploaded to a database for inspection or verification by supervisory military personnel. The verification of data provided by analysts or military personnel may result in the data being labeled as "authorized." Such authorized data may be used by supervisory military personnel in planning future missions.

SUMMARY

Some embodiments are directed to a method of collecting observational data associated with an event. The method comprises acts of actuating a trigger control in a first vehicle to initiate a retrieval procedure for the event, wherein the retrieval procedure collects at least some observational data from at least one system incorporated in the first vehicle, selecting at least one tag category to associate with the event, and storing the at least one tag category, and the least some observational data associated with the event, in a database.

Some embodiments are directed to a computer readable medium, encoded with a series of instructions, that when executed on a computer, perform a method. The method comprises detecting an actuation of a trigger control, sending a request to at least one system to provide at least some observational data in response to the detecting the actuation, and storing the at least some observational data in at least one data structure.

Some embodiments are direct to a system for sharing observational data in real time during a coordinated military operation comprising a first vehicle. The system comprises at least one trigger control, a controller configured to send, in response to actuation of the at least one trigger control, a request to at least one sensor to provide at least some observational data related to an event, a memory to store the at least some observational data, and a network interface configured to transmit via a wireless transmitter at least a portion of the at least some observational data to a receiver located outside of the first vehicle.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The accompanying drawings are not intended to be drawn to scale. In the drawings, each identical or nearly identical component that is illustrated in various figures is represented by a like reference character. For purposes of clarity, not every component may be labeled in every drawing. In the drawings:

FIG. 2 is a representation of a data structure for use with some embodiments of the invention;

DETAILED DESCRIPTION

Figure 1:
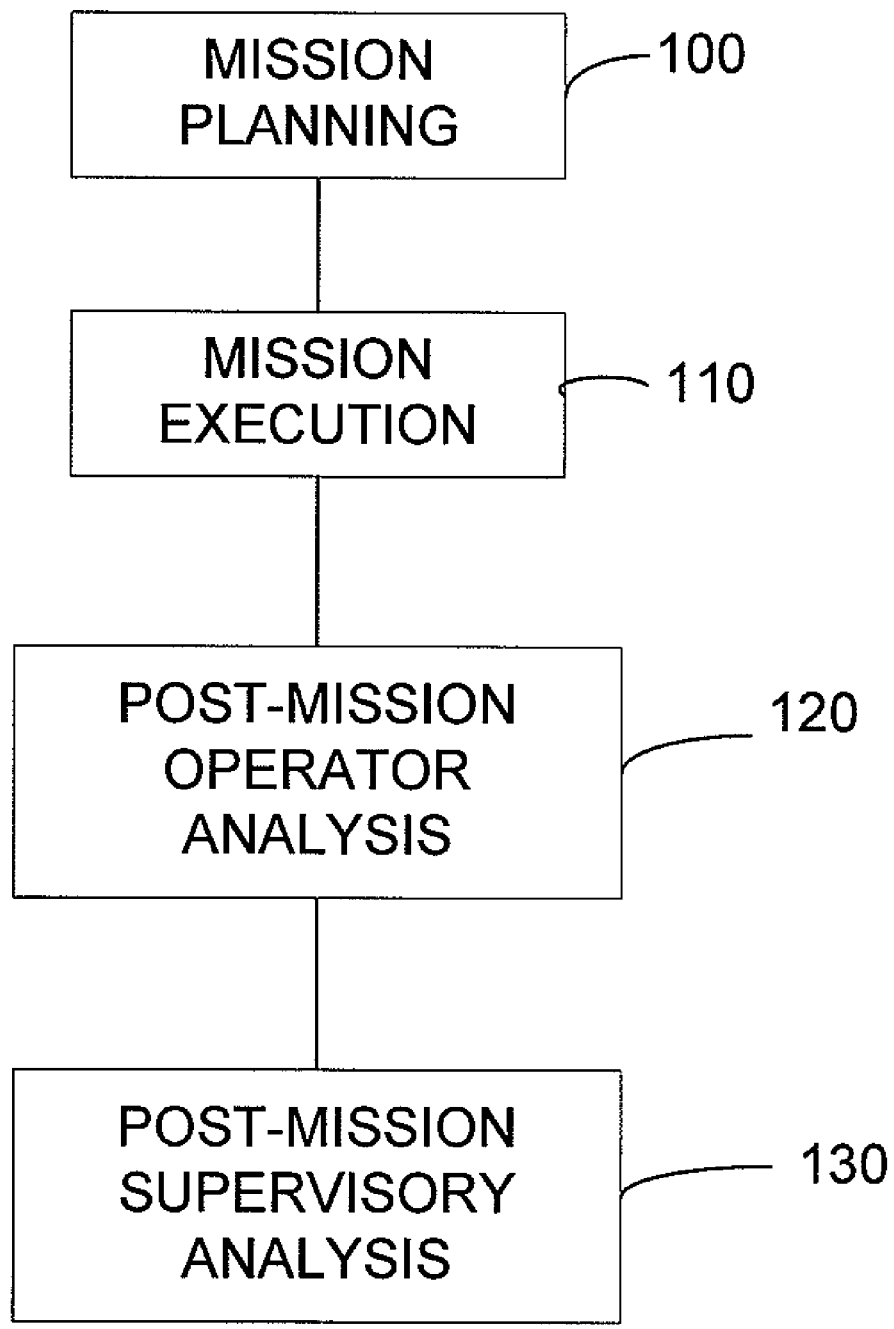
FIG. 1 is a schematic of stages in a coordinated operation according to some embodiments of the invention.

Applicants have recognized and appreciated that conventional methods of collecting and sharing observational data after a mission has been completed may be improved by enabling individual personnel to record and share "non-authoritative" tactical observational information in real-time during the execution of a mission. During mission execution, such non-authoritative information may be recorded and shared between personnel in the field, and the observational data may be saved for later inspection. Following mission completion, the non-authoritative observations may be annotated and used as a source for further tactical mission planning and execution.

The present disclosure is generally directed to methods and apparatus for facilitating the collection and sharing of non-authoritative observational data during a coordinated operation. The coordinated operation may be a military mission, or the coordinated operation may be any other suitable scenario that may aid from planning and operator feedback, including, but not limited to a peacetime rescue mission, a humanitarian aid mission, a traffic incident alert system, or other alert systems for vehicles. While it should be appreciated that the methods and systems described herein may be used in any suitable situation, and for any suitable purpose, the embodiments described below refer to use with military strategic planning.

Conventional systems for collecting information for strategic planning of military operations often employ authoritative sources to analyze geospatial data such as satellite imagery or other maps to identify potential points of interest. The information that is collected in this manner may be entered into one or more geospatial databases that may be referenced by senior military personnel during mission planning. In some instances, following execution of a mission, some soldiers, pilots, or other military personnel (collectively "military operators") who participated in the mission execution may be debriefed to provide additional observational information that may be used to augment, confirm, or deny the information stored in the one or more geospatial databases. In yet, still other instances, military operators may share observational information among themselves via informal conversations.

Applicants have recognized and appreciated that such conventional methods of collecting and sharing observational data may be improved by enabling military operators to quickly tag and share information about events that they observe during execution of a mission. For example, during a mission, a pilot may encounter low power lines, and the pilot may wish to share this information with other pilots in the squadron. In some embodiments, the pilot may accomplish this by actuating a trigger mechanism to tag the event. The trigger mechanism may be a button on a multi-function display such as a high-resolution liquid crystal display unit from L-3 communications (see http://www.1-3com.com/rcc/products/displays/multidisplay.html). Alternatively, the trigger mechanism may be any other suitable type of input device, such as a voice-activated input device, and embodiments of the invention are not limited in this respect. After tagging the event, the observational information may be transmitted to some or all of the other pilots in the squadron, and the observational information may be stored in a local database for further post-mission analysis.

According to some embodiments, observational information may be used in at least four stages of a military operation as shown in FIG. 1. In a mission planning stage 100, supervisory military personnel may reference observational information from one or more previous missions, and any other suitable information, such as information from at least one geospatial database, to devise a strategy for successfully executing a mission. After the relevant data has been analyzed, the supervisory military personnel may meet with the military operators that will be participating in the mission, to brief them about the details of the mission, including providing them with any pertinent observational information that may affect the mission (e.g., downed power lines, enemy positions, road obstructions, etc.).

Once the military operators have been briefed, the mission may be executed in mission execution stage 110. During mission execution 110, military operators may communicate with each other using radio transmissions, network transmissions (e.g., wireless, satellite, etc.), or any other suitable communication system. Applicants have appreciated that information observed on the battlefield may sometimes disagree with intelligence information provided during the mission planning stage 100. For example, the intelligence information may have been gathered over the course of days, weeks, or months, and as such, it may be outdated. Indeed, many developments may have taken place since the intelligence information was collected, such as enemy soldiers moving locations, new road obstructions having been formed, storms having damaged power lines, etc. Thus, it is imperative that the military operators executing the mission be able to communicate the updated observational information to each other to ensure that the mission proceeds without undue difficulties. Conventional systems relied primarily on radio communication to share such observational information. Applicants have recognized that such inter-operator communications may be improved by providing an operator with a quick and easy method for digitally tagging observed events, and allowing the operator to transmit information related to the tagged event to at least one other operator participating in the mission. Thus, some embodiments are directed to methods and apparatus for facilitating the collection and dissemination of observational data during the execution of a coordinated operation such as a military mission.

After a mission has been completed, observational information collected during the mission may be analyzed to provide useful guidance for future military strategic planning. According to some embodiments, post-mission review of the collected observational information may take place in at least two stages. Applicants have appreciated that, while conventional methods of obtaining post-mission information from operators (e.g., debriefing) may serve a useful purpose, some operators may fail to remember all potential events of interest which they encountered during the mission. Thus, in operator analysis stage 120, an operator may review the tagged observational information that was stored during the mission. During this review, the operator may decide whether or not the observational data should be considered by a supervisor, and the operator may choose to supplement the observational data by adding additional annotations to the data.

Following the operator analysis stage 120, some or all of the tagged observational events not discarded by an operator may be analyzed by supervisory military personnel in the supervisor analysis stage 130 to consider if the information should be saved in a more permanent form. For example, a military unit may have one or more "foundational" databases in which information may be considered "credible" or "authoritative," and thus may be used for mission planning purposes. In the supervisor analysis stage 130, supervisory military personnel may decide whether any of the non-authoritative observational data recorded by an operator should be saved in one of the foundational databases, thereby relabeling the non-authoritative observation as an authoritative source of information for planning future missions. It should be appreciated that any suitable criteria may be established to determine if some or any of the non-authoritative observational data should be considered as authoritative data, and embodiments of the invention are not limited in this respect.

While four different stages of a coordinated operation have been shown in FIG. 1, various aspects of embodiments of the invention are directed primarily to the mission execution stage 110, and the two post-mission analysis stages 120 and 130. It should be appreciated, however, that the mission planning stage 100 may be directly or indirectly affected by employing various embodiments of the invention, and the examples provided herein do not limit the scope of any of the embodiments' application in any way.

In some embodiments, one or more data structures similar to that shown in FIG. 2 at 200 may be created to store information related to one or more observed events. Such a data structure 200 may correspond to a data structure in an underlying computer-readable medium not shown. Such computer implemented data structures may be implemented in any suitable form, such as, but not limited to, a relational database, linked lists, arrays, matrices, a flat file database, and so forth. A data structure 200 may be schematically represented by a plurality of fields arranged into rows and columns, where each row (or column) may represent information related to a single observational event. In the present invention, the collection of data corresponding to a single event may be referred to as a "tag." That is, in some embodiments, an operator may actuate a trigger control to initiate a process of collecting observational data, wherein the observational data may populate a tag. Each tag may have an associated tag identifier 210, and the tag identifier may be used to uniquely identify a tag in data structure 200. For example, in some embodiments the tag identifier 210 may be a time at which the tag was created, or some other combination of information that uniquely identifies the tag.

Figure 3:
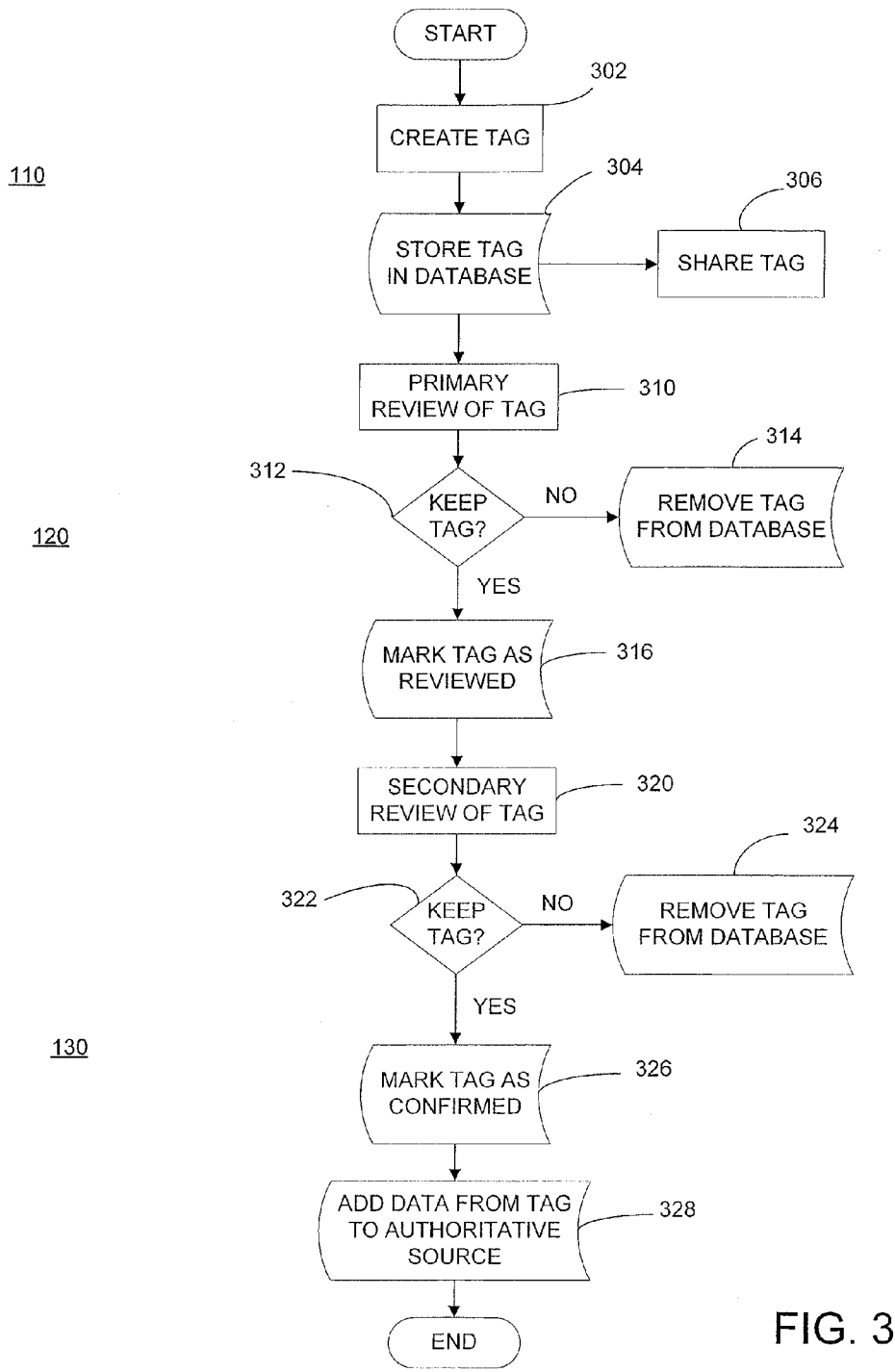
FIG. 3 is a flow chart of a process for collecting and storing observational data according to some embodiments of the invention.

A schematic overview of a process for using tags in accordance with some embodiments is shown in FIG. 3. While a general overview of a process flow for tags is presented with reference to FIG. 3, further details regarding some or all of the acts are provided below with reference to FIGS. 5, 6, and 8. As such, the descriptions of acts provided in connection with FIG. 3 do not limit embodiments of the invention in any way.

A first series of acts may be associated with mission execution stage 110. For example, in step 302, a tag for an observational event may be created in act 302, and the tag may be stored in a local database 304. In some embodiments, the local database may comprise one or more data structures for storing observational data such as the data structure shown in FIG. 2. In act 306, the stored tag may be shared with other operators via at least one communication network including, but not limited to, a peer-to-peer network, a global information grid (GIG), or any other suitable wireless communication network.

A further series of acts may be associated with post-mission operator analysis stage 120. After an operator has returned from a mission, the operator may perform a primary review of a tag in act 310. In some embodiments, some or a portion of the local database containing at least the tag may be downloaded from a computer in the operator's vehicle to another database for primary review. However, in other embodiments, the primary review may be performed via a graphical user interface displayed on a display unit connected to the computer in the operator's vehicle. In a step 312, an operator may decide whether or not to keep a tag, or to remove the tag from the database. If the operator determines that the tag should not be kept in the database, the tag may be removed from the database in act 314, otherwise the tag may remain in the database, and an indication that the tag was reviewed may be associated with the tag in act 316.

In some embodiments, at least some or all of the tags that have been marked as reviewed may be reviewed for a second time by a supervisor to determine if the tag should be included as an authoritative source. A secondary review of a tag may be initiated by a supervisor in act 320, wherein the supervisor may determine in act 322 if the tag should be kept or discarded from the database. If it is determined that the tag should not be an authoritative source, the tag may be removed from the database in act 324. Otherwise, the tag may remain in the database, and the tag may be marked as confirmed, indicating that a supervisor reviewed the tag, and that the data contained therein should be added to an authoritative source, such as a foundational database. In act 328, at least some of the data contained within the tag may be added to an authoritative source, and the process may end.

Figure 4:
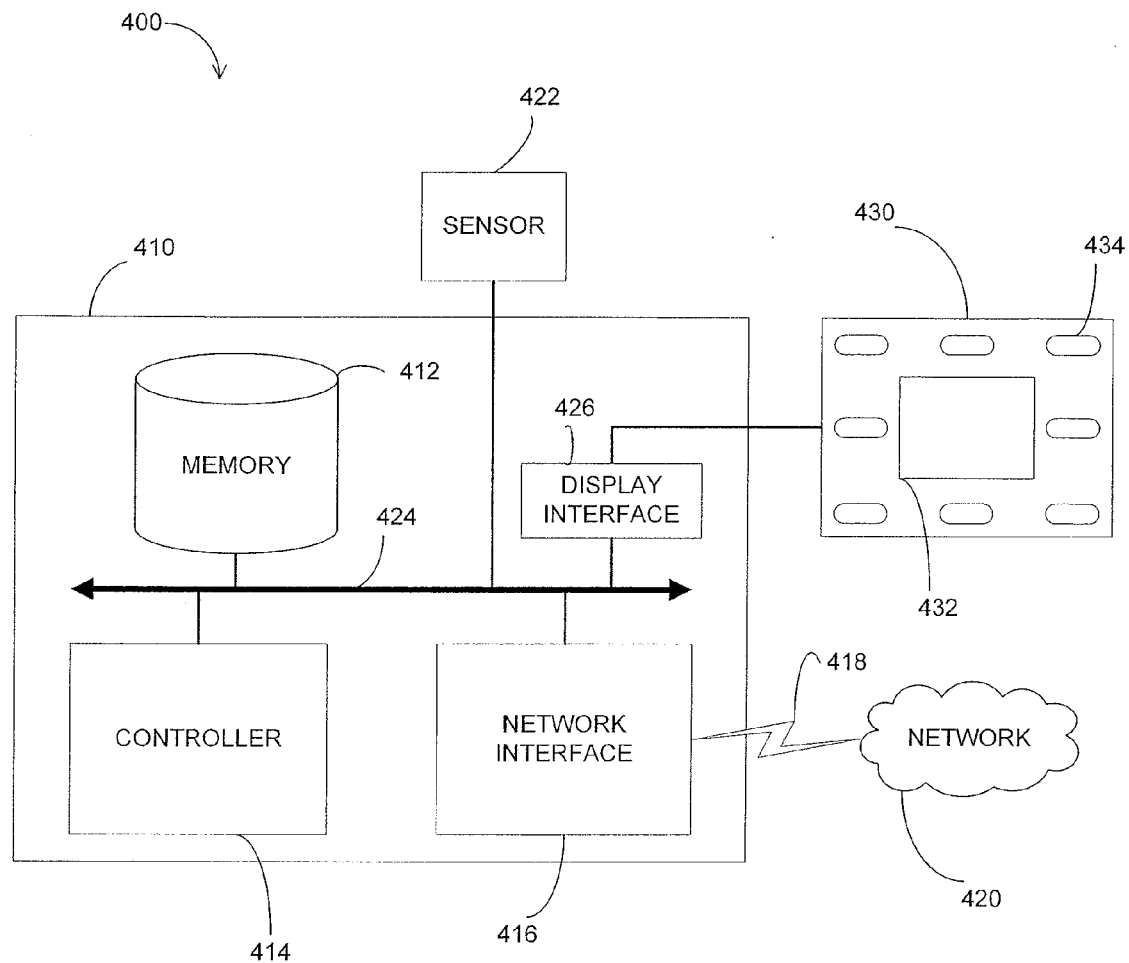
FIG. 4 is a computer system environment on which some embodiments of the invention may be implemented.

FIG. 4 illustrates an example of a suitable computing system environment 400 on which some embodiments may be implemented. The exemplary computing system environment 400 includes a general purpose computing device in the form of a computer 410. Components of the computer may include, but are not limited to a memory 412, a controller 414, such as a programmable processor, a network interface 416, a display interface 426, and a system bus 424 that couples various system components to the controller 414. The system bus 424 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The memory 412 may include volatile and/or nonvolatile memory such as read only memory (ROM), random access memory (RAM), or any other type of removable/non-removable, volatile/nonvolatile memory including, but not limited to, magnetic tape cassettes, flash memory card, digital versatile disks, digital video tape, solid state RAM, solid state ROM, and the like. The network interface 416 may be configured to communicate with one or more remote computers via a network 420 using any suitable network communication protocol. For example network interface may comprise a wireless transmitter and a wireless receiver for communicating with a remote computer via network 420 using wireless communication link 418.

In some embodiments, computing system environment 400 further comprises a display unit 430 connected to the system bus 424 via display interface 426. Display unit 430 may comprise a display 432, such as a liquid crystal display (LCD), and one or more trigger controls 434, which when actuated transmit signals to the computer 410 via the display interface 426. The trigger controls 434 may include pushbuttons, sliders, toggle switches, or any other suitable trigger control. It should be appreciated that although the trigger controls 434 are shown as part of display unit 430, the trigger controls 434 may alternatively be external to the display unit 430 and may be connected to system bus 424 in any suitable manner via any suitable input/output interface.

Computing system environment 400 may further comprise at least one sensor 422 for capturing observational information. The sensor 422 may be connected to the system bus 424 in any suitable manner, including via a networked connection local to a vehicle in which the computer system environment 400 is installed. The sensor 422 may comprise one or more instruments, systems, or subsystems for detecting and recording observational data related to the vehicle. For example, the sensor 422 may comprise one or more imaging sensors such as a camera or an infrared sensor, a navigational system such as a global positioning system (GPS), a situational awareness system, or any other suitable type of system for obtaining observational data. It should be appreciated that the computing system environment 400 is not limited to the components illustrated in the exemplary environment 400 and any other additions, deletions, or modifications to the components or combinations of components illustrated in FIG. 4 may also be used.

Figure 5:
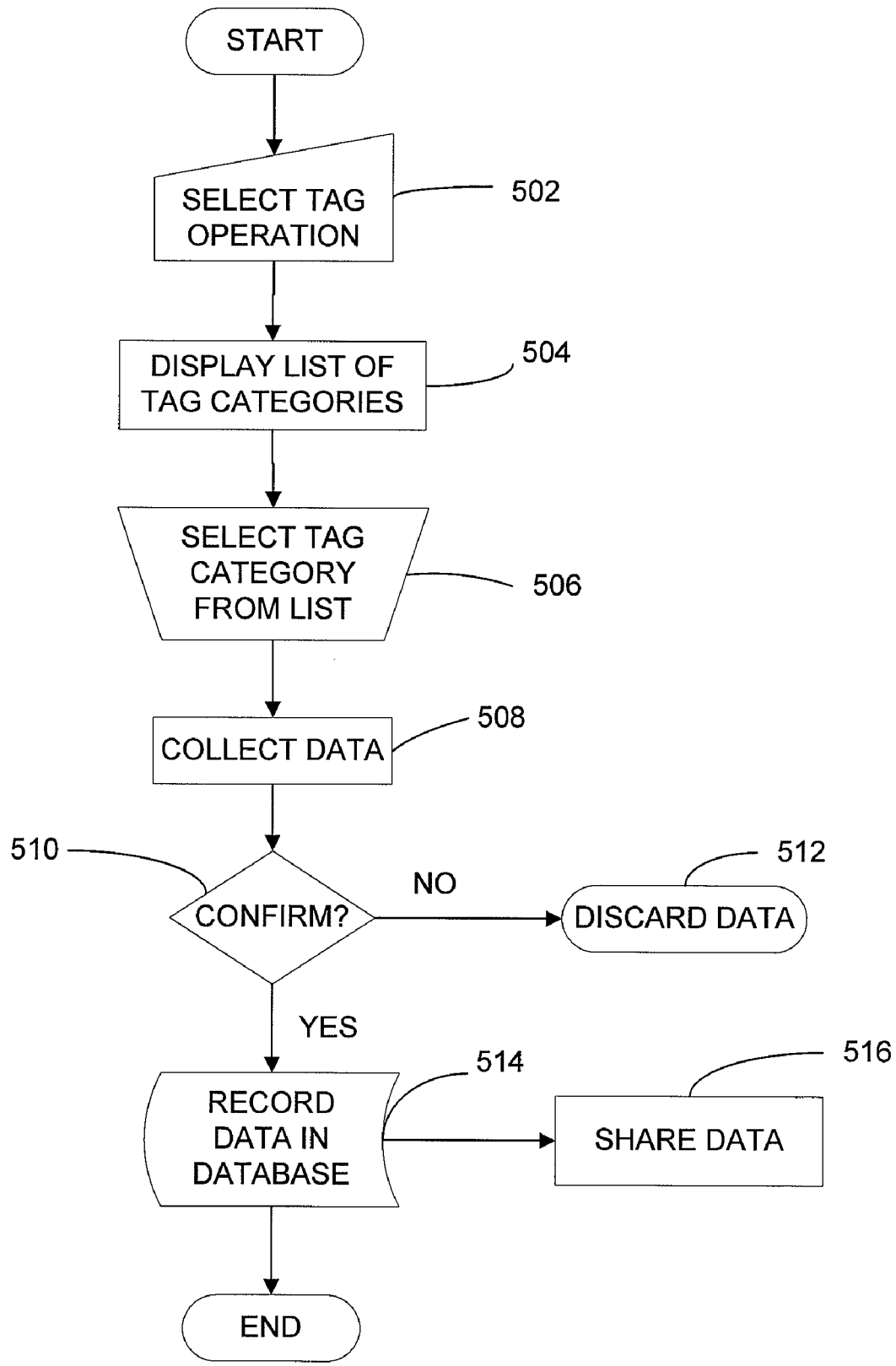
FIG. 5 is a flow chart of a process for collecting observational data associated with an event according to some embodiments of the invention.

Some embodiments may employ a process for creating a tag and populating the tag with observational information associated with a particular event during mission execution stage 110 as illustrated in FIG. 5. In act 502, an operator may actuate a trigger control to initiate a tag operation. The trigger control may be any suitable control, including, but not limited to, a button, a slider, a toggle switch, a microphone, or the like. In some embodiments, the trigger control may be integrated on a display unit connected to a computer in an operator's vehicle such as an aircraft, a tank, an automobile, or a ship. The trigger control may be actuated in any suitable way including manual actuation (e.g., pressing a button, flipping a toggle switch) or by using at least one voice-activation command. After initiating the tagging procedure, the operator may view a display listing possible tag categories in act 504. For example, possible tag categories may include "obstacle," "enemy," "high risk," "low risk," "point of interest," or any other suitable category. The operator may then select a tag category for the observed event from the displayed list of tag categories in act 506. Alternatively, in some embodiments, the trigger control may comprise multiple controls and each of the multiple controls may be programmed to correspond to a different tag category, such that when one of the multiple controls is actuated, the corresponding tag category for the control may be automatically selected.

In act 508, various observational data may be collected automatically by software executing on a computer in the operator's vehicle. Such observational data may include images such as an optical camera image, a forward-looking infrared (FLIR) sensor image, a RADAR image, a screen capture of a map displayed on a display unit connected to the computer, information related to the current operation state of the operator's vehicle, or any other suitable observational data. Some or all of this data may be stored in a local database connected to the computer, and in act 510, an operator may decide whether or not to store the data in the database. If an observer chooses to discard the observational data, it may not be written to the local database, but rather may be discarded in act 512. However, if the operator confirms that the data should be stored, the tag may be written to the local database in act 514. Upon writing the tag in the local database, the tag, or any observational data contained therein may be shared with one or more other operators via a wireless network as described above.

Figure 6:
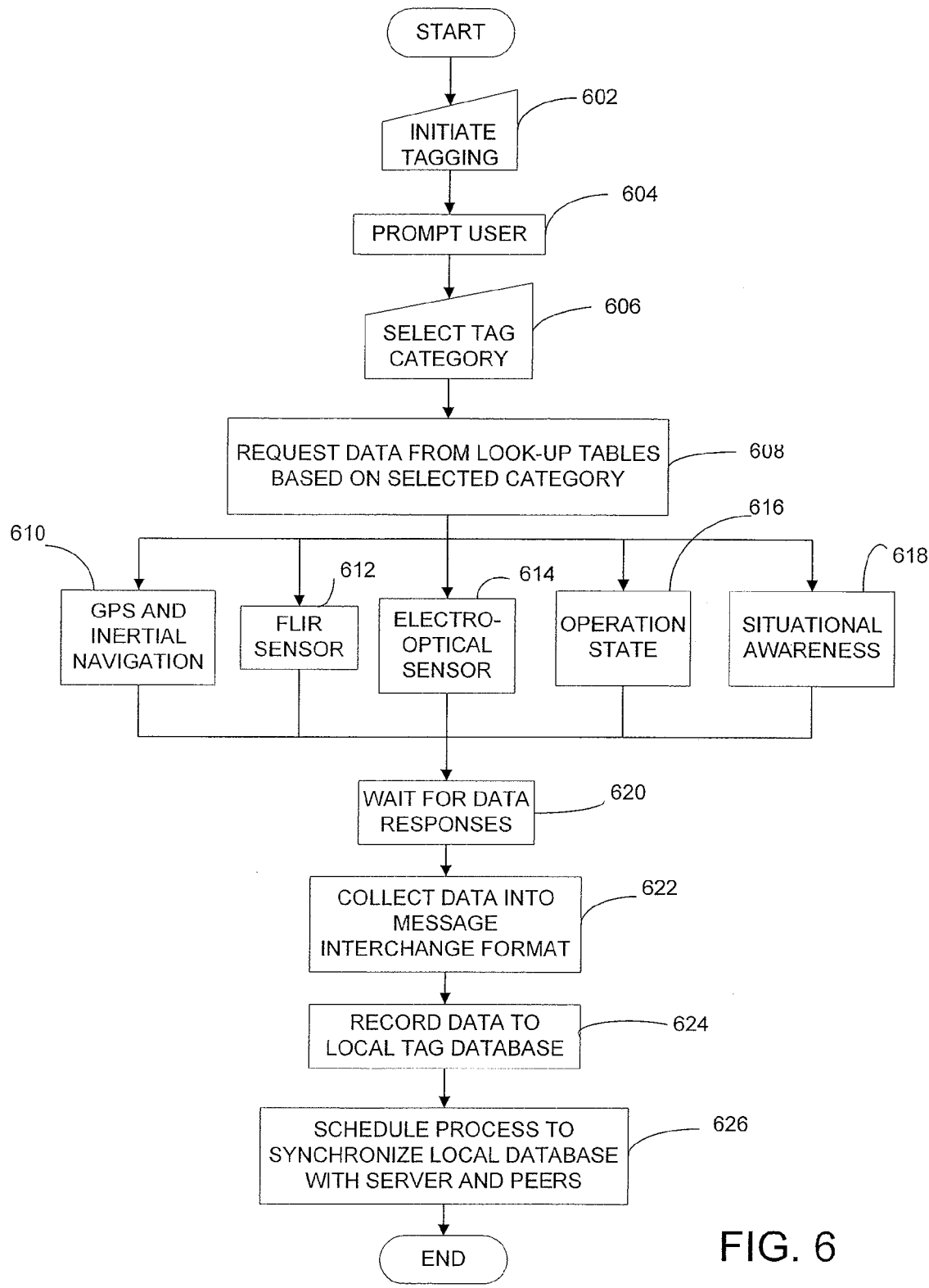
FIG. 6 is a flow chart of a process for collecting observational data according to some embodiments of the invention.

Instead of, or in addition to the acts shown in the process of FIG. 5, some embodiments may be directed to a process having acts as illustrated in FIG. 6. In step 602, an operator may initiate a tagging procedure. An operator may actuate a trigger control to initiate the tagging procedure at any time, and embodiments of the invention are not limited in this respect. In some embodiments, an operator may receive a notification of a potential event for which a tag may be recorded. The notification may be, for example, an indication on a map displayed on a display unit in the operator's vehicle, or any other suitable notification such as an audible alarm or the illumination of a light source. After actuating a trigger control to initiate the tagging procedure, the operator may be prompted in act 604 to select a tag category. In act 606, the operator may select a tag category, such as one of the tag categories described above, or any other suitable tag categories. It should be appreciated that in some embodiments, acts 602-606 may be consolidated into a single act if the trigger control comprises multiple controls, with each control of the multiple controls being associated with a different tag category.

In act 608, data may be requested from at least one system installed in the operator's vehicle, and the one or more requests may be based at least in part on the selected tag category. For example, if the selected tag category is "high risk," then a request may be made to all information sensors to provide observation data, whereas if the selected tag category is "obstacle," then only imaging systems may be tasked to provide observational information about the event being tagged. In some embodiments, the computer may comprise at least one memory having at least one look up table data structure stored thereon. The contents of the look up table data structure may comprise a listing of systems that should be queried in response to selection of a particular tag category. It should be appreciated that any subset of systems (including all systems) may be requested to provide observation data in response to any selected tag category, and the aforementioned examples are provided merely for illustrative purposes.

Acts 610-618 illustrate at least some systems that may be issued a request to provide observational data. In act 610, a navigation system such as a GPS or an inertial navigation system may be queried to provide a current geospatial location, and upon receipt of the request, the designated system(s) may transmit the appropriate data to the requesting computer. In act 612, a request may be sent to an FLIR sensor to transmit an infrared image to the requesting computer. For example, a request may be sent to the FLIR sensor to create an image of a 360 degree view around the vehicle, and to transmit the image to the requesting computer. Similarly, in act 614, a request may be transmitted to an electro-optical sensor (e.g., a camera) to capture imagery and to transmit the imagery to the requesting computer. In act 616, observational data related to the operational state of the operator's vehicle may be requested from various subsystems incorporated in the vehicle. For example, requests may be made to record the time, the amount of remaining fuel, or the current speed and heading, and the observational data associated with each of these requests may be transmitted to the requesting computer. In act 618, a situational awareness database may be queried to provide current track positions of other military operators or targets (e.g., friendly, hostile, neutral). It should be appreciated that the situational database may comprise many types of information depending on a particular implementation of embodiments of the invention. For example, if implemented on an aircraft, the situational database may comprise information about air traffic, storm-cell data, lightening strikes, etc., whereas if the situational database were implemented on a land vehicle, the situational database may comprise roadblocks, road conditions, or any other suitable situational awareness information.

In act 620, the requesting computer may wait for responses from at least some of the queried systems and subsystems. In some embodiments, if a response is not received from a system or subsystem in a predetermined amount of time, at least one additional request may be transmitted to the unresponsive system or subsystem. In act 622, data received from the various systems or subsystems may be converted into a common message interchange format, which collectively forms a tag, for storage of the information in a local database. In act 624, the formatted data may be stored in a local database comprising one or more tags, wherein each tag represents data collected for an observed event. In some embodiments, data from each system may be stored in one or more fields in a data structure, such as the data structure shown in FIG. 2, although it should be appreciated that other data structures may also be used. In some embodiments, after storing the collected data in the local database, a process may be scheduled to synchronize the local database with a central server and at least some of the data in a tag may be transmitted to other operators to alert them about the observed event in act 624.

Figure 7:
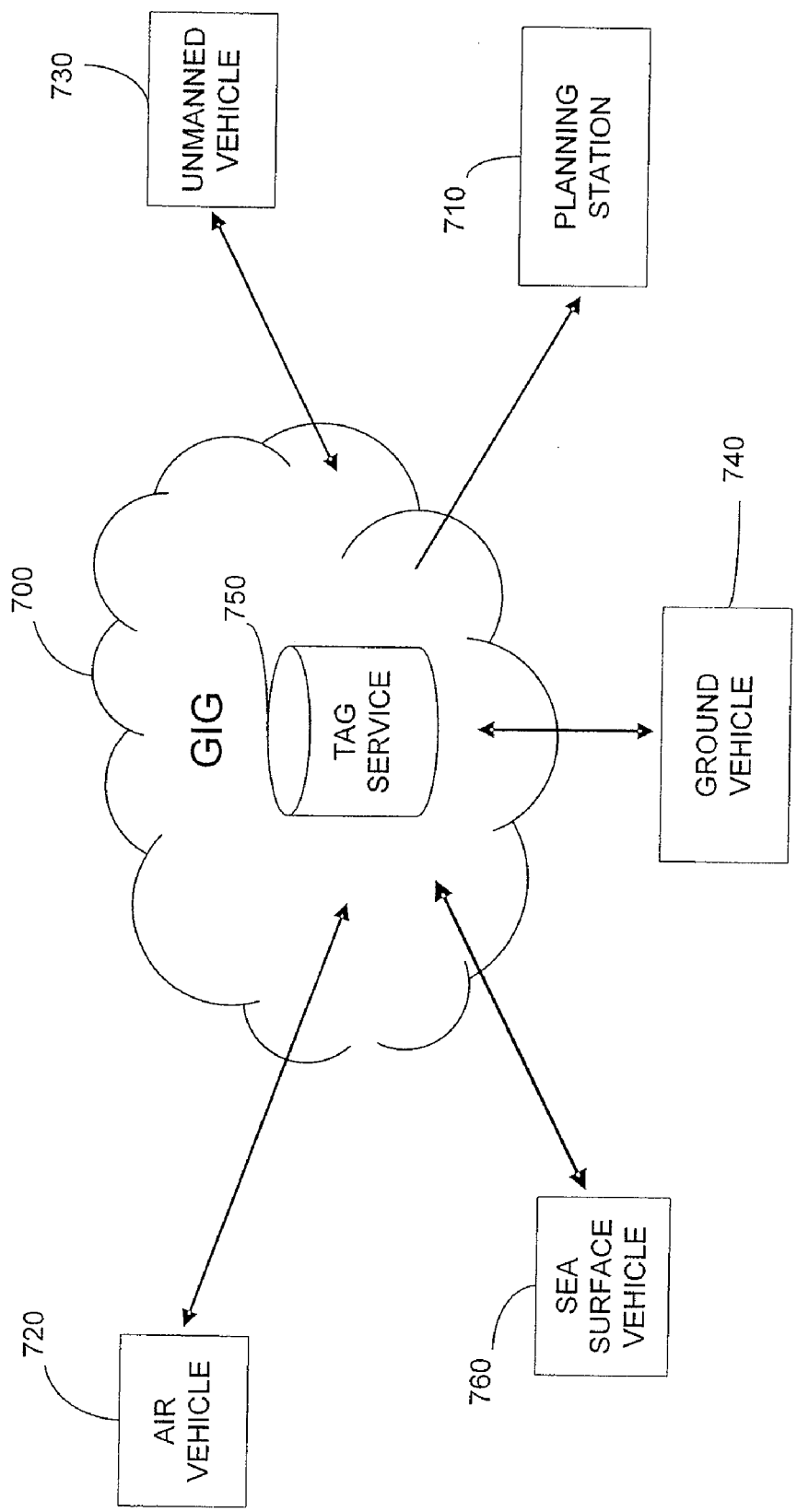
FIG. 7 is a schematic of a networked system for communication of observational information according to some embodiments of the invention.

In some embodiments, at least some of the data in a tag may be shared between operators using a network or group of networks such as the Global Information Grid (GIG) 700 as shown in FIG. 7. The GIG 700 may be a collection of disparate networks whose scope may extend from military analysts at a planning station 710 to soldiers in the field anywhere in the world. Communication channels between computers in a GIG 700 may be either wired or wireless. For example, a GIG 700 may allow communication between an operator in an air vehicle 720, such as a fighter jet or a helicopter, an unmanned vehicle 730, such as an unmanned air vehicle (UAV), and unmanned ground vehicle (UGV), or an unmanned underwater vehicle (UUV), an operator controlling an autonomous vehicle 740, and an operator controlling a sea surface vehicle 760 such as an aircraft carrier or a battleship. The GIG 700 may comprise a tag service 750 which may be used to store, exchange, or otherwise manage tags generated by vehicle operators. It should be appreciated that any or all of the communications between any of the operators depicted in FIG. 7 may take place online or off-line, and embodiments of the invention are not limited in this respect.

Figure 8:
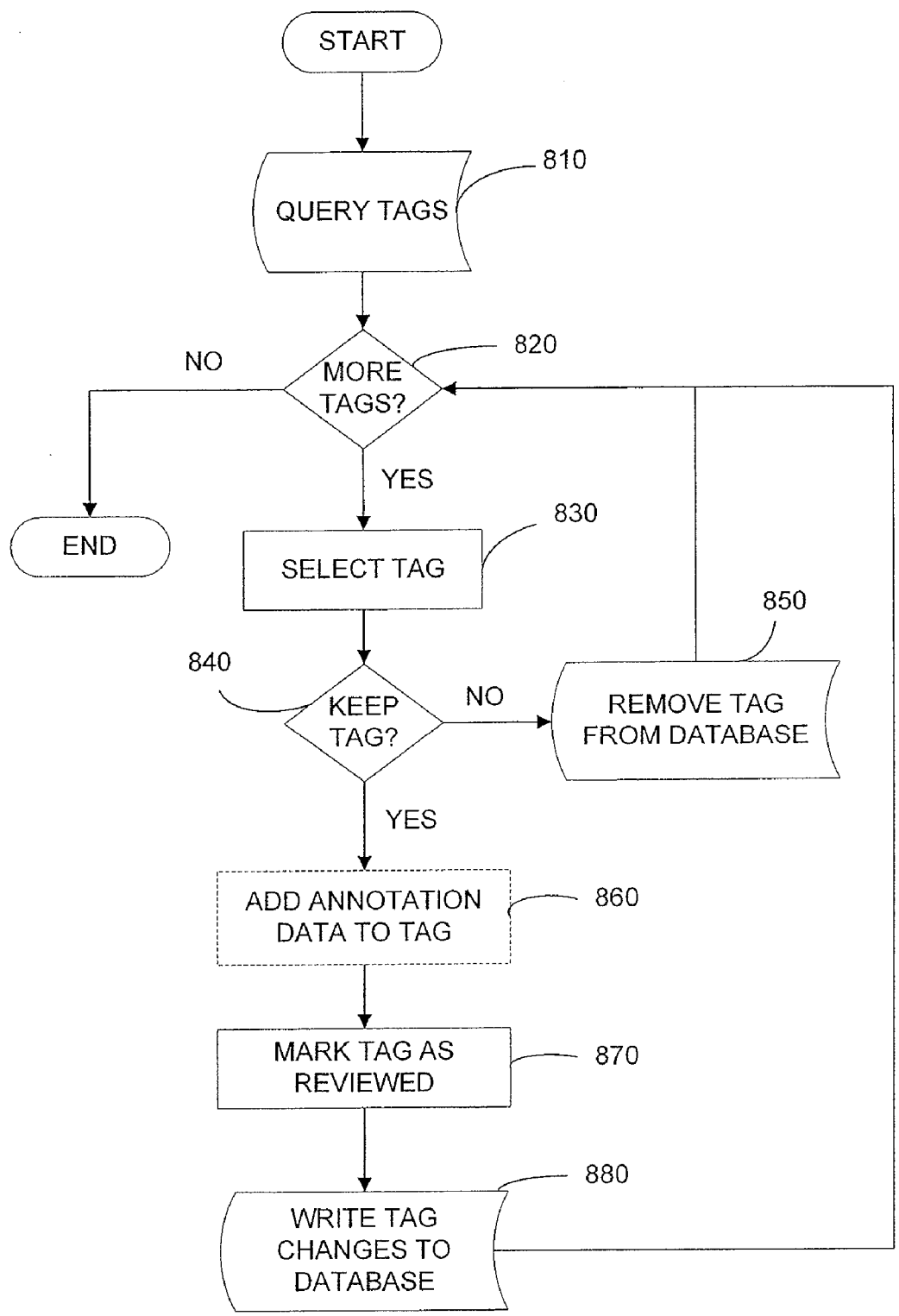
FIG. 8 is a flow chart of a review process according to some embodiments of the invention.

Some embodiments may employ a process for reviewing the contents of a tag following the execution of a coordinated operation, such as a military mission, as illustrated in FIG. 8. Prior to beginning the process illustrated in FIG. 8, data stored in a local database on a computer in an operator's vehicle may be transferred to a central computer, although embodiments of the invention are not limited in this respect, and the acts in FIG. 8 may alternatively be performed by interacting with a graphical user interface executing on a computer connected to the local database in the operator's vehicle.

A review process according to some embodiments may begin in act 810 by generating a query for some or all tags stored on a particular mission. In act 820, it may be determined if there are any more tags to review. If there are tags to review, a list of reviewable tags may be presented via a graphical user interface on a computer. An operator may select a tag to review in act 830, and then may choose to keep or remove the tag from the database in act 840. If the operator chooses to remove the tag, the tag may be deleted from the database in act 850, and process control may return to act 820, where it may be determined if there are more tags to review. If the operator chooses to keep the tag, the operator may optionally choose to add annotation data to the tag in act 860. For example, upon reviewing a tag, the operator may remember additional details of the observed event that should be recorded in the database. In embodiments where a tag is represented by a portion of data structure 200 as shown in FIG. 2, such additional details may be recorded in an annotation field associated with each tag (e.g., row or column) of the data structure. Additionally, in some embodiments, an operator may designate some tags as having a high priority and other tags as having a low priority. Such priority ratings may be used by supervisors as preliminary indication of which tags should be considered for addition to an authoritative source for future mission planning.

In act 870, the tag may be labeled as having been reviewed, and in act 880, the changes to the tag may be written to the database. In some embodiments, a tag may be labeled as reviewed by altering the contents of a field in the tag. For example, a tag may have a field for storing the tag's "status," and as the tag proceeds through the process illustrated in FIG. 3, the data stored in the status field may be updated from "collected" to "reviewed" to "confirmed," as the tag progresses from the mission execution stage 110 to the operator review stage 120 to the supervisor review stage 130. After writing the changes to a tag to the database, process control may proceed to act 820, and the process may repeat until an operator has reviewed all of the tags, at which point the process may end.

A similar process such as that illustrated in FIG. 8 may be implemented for review of tags by a supervisor after an operator has finished reviewing the tags from a mission. For example, as shown in FIG. 3 and as discussed above, a supervisor may choose to select some of the tags as containing data that should be added to an authoritative source for future mission planning. In some embodiments, the selection process may be facilitated by examining the contents of a priority field in a tag, which may indicate the level of priority that the operator who created the tag assigned to the tag.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of collecting observational data associated with an event, the method comprising acts of:
    (A) initiating, in response to an actuation of a trigger control by at least one user in a first vehicle, a retrieval procedure for the event, wherein the retrieval procedure collects at least some observational data associated with the event from at least one system incorporated in the first vehicle;
    (B) receiving from the at least one user in the first vehicle, a selection of at least one tag category to associate with the event;
    (C) generating based, at least in part, on the at least one selected tag category, at least one request for the at least some observational data;
    (D) receiving the at least some observational data in response to the request; and
    (E) storing the at least one tag category and the at least some observational data associated with the event in a database.

2. The method of claim 1, further comprising acts of:
    (F) transmitting the at least some observational data to at least one server;
    (G) storing the transmitted at least some observational data on the at least one server;
    (H) adding at least one annotation to at least one datum of the at least some observational data stored on the at least one server; and
    (I) labeling the at least one datum as having been reviewed.

3. The method of claim 1, wherein storing the at least some observational data comprises:
    creating a data structure comprising at least one first field for storing the at least one tag category and at least one second field for storing the observational data; and
    populating the data structure with the at least some observational data collected during the retrieval procedure.

4. The method of claim 1, wherein the trigger control is actuated by the at least one user by pressing a button integrated on a display unit in the first vehicle.

5. The method of claim 4, further comprising:
    displaying a notification related to the event to the at least one user on the display unit;
    wherein the trigger control is actuated subsequent to displaying the notification.

6. The method of claim 1, further comprising the acts:
    (F) transmitting at least a portion of the at least some observational data to a receiver located in a second vehicle and
    (G) receiving a confirmation message that the transmitted observational data was successfully received.

7. The method of claim 6, wherein transmitting at least a portion of the at least some observational data comprises wirelessly transmitting the at least some observational data over a network.

8. The method of claim 7, wherein the network is a peer-to-peer network.

9. The method of claim 6, wherein the network is a Global Information Grid (GIG).

10. A non-transitory tangible computer readable storage medium, encoded with a series of instructions, that when executed on a computer, perform a method, the method comprising:
    providing a notification to at least one user, wherein the notification indicates a potential event for recording a tag;
    detecting, in response to providing the notification, an actuation of a trigger control by the at least one user;
    receiving a selection of at least one tag category to associate with the potential event;
    sending based, at least in part, on the at least one selected tag category, a request to at least one system to provide at least some observational data; and
    storing the at least some observational data in at least one data structure.

11. The computer readable medium of claim 10, wherein the computer is located in a vehicle, and the method further comprises transmitting at least a portion of the at least some observational data to a receiver located outside of the vehicle.

12. The computer readable medium of claim 10, wherein actuation of the trigger control is a voice activated actuation.

13. The computer readable medium of claim 10, wherein the at least one data structure comprises a portion of a local database stored in a memory associated with the computer.

14. The computer readable medium of claim 13, wherein the method further comprises updating a central database with the portion of the local database.

15. A system for sharing observational data in real time during a coordinated military operation comprising a first vehicle, the system comprising:
    at least one trigger control configured to receive input from at least one user in the first vehicle;
    a controller configured to initiate a retrieval procedure in response to receiving input via the at least one trigger control, wherein the retrieval procedure sends a request to at least one sensor to provide at least some observational data related to an event;
    at least one user interface configured to provide the at least one user an option to associate at least one tag category with the at least some observational data, wherein the controller is configured to send the request to the at least one sensor based, at least in part, on a selection of the at least one tag category;
    a memory to store the at least some observational data; and
    a network interface configured to transmit via a wireless transmitter at least a portion of the at least some observational data to a receiver located outside of the first vehicle.

16. The system of claim 15, wherein the coordinated military operation further comprises a second vehicle, and the receiver is located in the second vehicle.

17. The system of claim 15, wherein the at least one sensor includes at least one global positioning system receiver and at least one image capture device.

18. The system of claim 15, wherein the at least one sensor includes at least one operational module for providing operational status data associated with an operational status of the first vehicle.

19. The system of claim 15, wherein the first vehicle is an aircraft vehicle.

20. The system of claim 15, wherein the first vehicle is an unmanned vehicle.

* * * * *